United States Patent
Matsuoka et al.

[11] Patent Number: 5,950,593
[45] Date of Patent: Sep. 14, 1999

[54] GAS ENGINE WITH PRE-COMBUSTION CHAMBER

[75] Inventors: Hiroshi Matsuoka, Yamato; Hideo Kawamura, Kanagawa-ken; Kenrou Nakashima, Ayase, all of Japan

[73] Assignee: Isuzu Ceramics Research Institute Co., Ltd., Kanagawa-ken, Japan

[21] Appl. No.: 08/821,196

[22] Filed: Mar. 20, 1997

[30] Foreign Application Priority Data

Mar. 25, 1996 [JP] Japan ................................. 8-093056

[51] Int. Cl.$^6$ .................................................. F02B 19/02
[52] U.S. Cl. ............................................. 123/292; 123/293
[58] Field of Search ................................ 123/293, 292, 123/286

[56] References Cited

U.S. PATENT DOCUMENTS

| | | | |
|---|---|---|---|
| 3,809,030 | 5/1974 | Moiroux. | |
| 4,513,708 | 4/1985 | Latsch et al. | 123/293 |
| 5,024,193 | 6/1991 | Graze | 123/293 |
| 5,333,582 | 8/1994 | Kawamura | 123/292 |
| 5,454,356 | 10/1995 | Kawamura | 123/292 |

FOREIGN PATENT DOCUMENTS

| | | |
|---|---|---|
| 0588593 | 3/1994 | European Pat. Off. . |
| 9011435 | 10/1990 | WIPO . |

*Primary Examiner*—Marguerite McMahon
*Attorney, Agent, or Firm*—Browdy and Neimark

[57] ABSTRACT

This gas engine with pre-combustion chambers effectively uses ejection energy of flames and air-fuel mixtures ejected from the pre-combustion chambers into the main combustion chambers to shorten the combustion duration and thereby enhance performance. Installed in the cylinder head at the central part of the cylinders are pre-combustion chamber structures that form pre-combustion chambers. Combustion chamber structures are formed with communication port that communicate the pre-combustion chambers with the main combustion chambers. Control valves are provided to open and close the communication ports. The communication ports comprise main communication ports and sub-communication ports formed around the main communication ports. The sub-communication ports are formed in the combustion chamber structures so that they extend radially toward the cylinder periphery.

7 Claims, 4 Drawing Sheets

GAS ENGINE WITH PRE-COMBUSTION CHAMBER

BACKGROUND OF THE INVENTION

1. Field of the Invention

The present invention relates to a gas engine having a pre-combustion chamber in a cylinder head and using a gas fuel such as natural gas.

2. Description of the Prior Art

In conventional gas engines having a pre-combustion chamber in the cylinder head, the pre-combustion chamber is made fuel-rich for ignition and combustion to ensure combustion in lean regions in a main combustion chamber thereby stabilizing combustion. The gas engine, however, uses a natural gas as fuel, that is, the fuel is in a gas phase. When a gas is drawn into the engine during the intake stroke and then compressed, the air-fuel mixture is compressed to high pressures and its temperature rises to so high a level that a self-ignition phenomenon (knocking) may result. Normally, the natural gas must have a compression ratio of less than 12 to avoid self-ignition. As for the thermal efficiency, the smaller compression ratio means a lower thermal efficiency.

In the gas engine with a pre-combustion chamber, to further stabilize combustion of lean fuel, it is conventional practice to install a control valve in a communication port communicating the pre-combustion chamber with the main combustion chamber and to close the control valve during the intake stroke so that only air is drawn into the main combustion chamber, with a natural gas introduced into the pre-combustion chamber. In the gas engine with a pre-combustion chamber, the control valve is opened immediately before the top dead center to admit air instantly into the pre-combustion chamber by a pressure difference between the main combustion chamber and the pre-combustion chamber, causing the natural gas and air to quickly mix and ignite and then to flow out from the pre-combustion chamber through the communication port into the main combustion chamber. In this way the lean fuel combustion is completed in a short time.

A gas engine disclosed in Japanese Patent Laid-Open No. 310550/1995 introduces a gas fuel such as natural gas into the pre-combustion chamber, compresses only the air drawn into the main combustion chamber to an increased compression ratio, detects the internal pressure in the pre-combustion chamber by a sensor such as piezoelectric element, operates a fuel supply valve based on the internal pressure to supply an appropriate amount of fuel according to the load and revolutions, and opens the control valve in the communication port, while the air in the main combustion chamber is heated to high temperatures, to admit the highly pressurized air from the main combustion chamber into the pre-combustion chamber to quickly mix the gas fuel in the pre-combustion chamber with the highly pressurized air, thereby igniting and burning the air-fuel mixture in a short period of time. Because the fuel in the pre-combustion chamber is too rich, it is burned in a way that limits the production of NOx, and the flames as well as fuel are rapidly ejected from the pre-combustion chamber into the main combustion chamber where the air-fuel mixture spread as uniformly as possible is burned in the secondary combustion in a short duration, thus reducing the production of NOx and HC, enhancing heat efficiency, and preventing self-ignition of gas fuel or knocking.

Compared with a direct injection type diesel engine, the diesel engine with a pre-combustion chamber has the advantage of a reduced amount of NOx generated though its thermal efficiency is lower. The greatest reasons why the engine with a pre-combustion chamber has a lower thermal efficiency than the direct injection type engine are that because the flames, after the primary combustion in the pre-combustion chamber, are ejected through the communication port connecting the main combustion chamber and the pre-combustion chamber and burned in the secondary combustion, the combustion time becomes long; that the communication port communicating the pre-combustion chamber with the main combustion chamber produces a throttle loss; and that a large air flow in the pre-combustion chamber results in a large heat dissipation loss. In the gas engine with a pre-combustion chamber, because the air-fuel mixture generation energy and the ejection energy, essential for combustion, are produced by the throttling or diameter reduction of the pre-combustion chamber's communication port, the passage area of the communication port cannot be increased, resulting in a large pumping loss. Further, because the mixture is made by a turbulent air flow, the thermal conductivity in the pre-combustion chamber is large increasing a cooling water loss.

In the vortex flow chamber type engines, the communication port connecting the pre-combustion chamber to the main combustion chamber is small and thus produces a throttle loss, reducing the engine output. If the communication port connecting the pre-combustion chamber and the main combustion chamber is inclined in a direction tangential to the pre-combustion chamber wall surface, not only is the air flow in the pre-combustion chamber activated, but there is no attenuation in the ejection energy of flames into the main combustion chamber after ignition, enabling the flames to reach the outermost circumference of the main combustion chamber in a short time. This improves air utilization, allows clean combustion with few noxious emissions and improves the engine output. In the case of a pre-combustion chamber having inclined sub-communication holes, under the condition that does not take into account the influences of swirl of air drawn into the main combustion chamber, the speeds of air passing through the sub-communication holes when the air enters into the pre-combustion chamber and when the air is ejected out after ignition are equal. If the diameter of the communication port is throttled to increase the ejection energy, the air flow or swirl generated in the pre-combustion chamber also becomes stronger.

Because the communication port connecting the main combustion chamber and the pre-combustion chamber is provided at a cylinder center or at an outer circumferential position, the distance that the ejected flow must travel becomes longer, leaving the mixing of air and fuel in the main combustion chamber insufficient, which in turn will cause HC emissions and smoke. Further, there is a problem that when a swirl-formed in the cylinder when the air is drawn in through the intake port-flows into the pre-combustion chamber through the communication port, the energy of the swirl cannot be fully utilized in the pre-combustion chamber because the communication port is throttled and inclined.

SUMMARY OF THE INVENTION

The object of the present invention is to solve the above-mentioned problems and to provide a gas engine having a pre-combustion chamber, in which a pre-combustion chamber structure forming a pre-combustion chamber and a combustion chamber structure forming a main combustion chamber are installed in the cylinder head; in which a communication port that communicates the pre-combustion chamber with the main combustion chamber comprises a main communication port and sub-communication ports; in which the sub-communication ports are first opened near the top dead center to introduce compressed air from the main combustion chamber into the pre-combustion chamber to ignite fuel in the pre-combustion chamber; in which an unburned air-fuel mixture and flames are ejected from the pre-combustion chamber into the main combustion chamber first through the sub-communication ports and then through the main communication port to spread by collision a mixture of ejected flames and air to quickly accomplish combustion in the main combustion chamber, thereby shortening the combustion duration and improving the performance; and in which when a control valve for opening and closing the communication port is fully open, the main communication port and the sub-communication ports are opened, and when the control valve is partly open, the sub-communication ports are opened.

This invention relates to a gas engine with a pre-combustion chamber which comprises: a cylinder head mounted on a cylinder block; valves for opening and closing ports formed in the cylinder head; combustion chamber structures installed in cavities in the cylinder head and having cylinders forming main combustion chambers; pre-combustion chamber structures arranged at substantially central parts of the combustion chamber structures and forming pre-combustion chambers; communication ports communicating the pre-combustion chambers to the main combustion chambers; control valves for opening and closing the communication ports; and fuel supply means for supplying gas fuel into the pre-combustion chambers; wherein the communication ports comprise main communication ports and sub-communication ports; wherein when the control valves are fully open the main communication ports and the sub-communication ports are open, and when the control valves are partly open the sub-communication ports are open.

The main communication ports and the sub-communication ports are formed in the combustion chamber structure. The combustion chamber structure comprises head underside portions installed in the cavities in the cylinder head and head lines comprising liner upper portions forming the cylinders and integral with the head underside portions.

The sub-communication ports are spaced from each other circumferentially around the main communication ports formed in the combustion chamber structure and extend radially from a wall surface of the main communication ports toward the cylinder periphery.

In the gas engine with a pre-combustion chamber, when the control valves are partly open, end faces of bevel portions of the control valves are lifted to a position where they do not interfere with the sub-communication ports. The control valves reciprocate in contact with the wall surface of the main communication ports.

Further, the pre-combustion chamber structures forming the pre-combustion chambers, the combustion chamber structures forming the main combustion chambers, and the control valves are formed of any one of heat resistant ceramics and a heat resistant composite material of ceramics and metals.

Alternatively, in the gas engine with a pre-combustion chamber the communication ports comprise main communication ports and sub-communication ports, the main communication ports are formed by guide portions larger in diameter than bevel portions forming the control valves, and the sub-communication ports extend radially from the guide portions toward the cylinder periphery and are spaced from each other circumferentially of the guide portions.

The sub-communication ports formed in the combustion chamber structures are formed as grooves that are cut open in an area opening to the main combustion chambers, and when the control valves are open, the open areas of the sub-communication ports are adjusted by outer circumferential surfaces of the bevel portions of the control valves.

Alternatively, the gas engine with a pre-combustion chamber comprises: projected portions arranged substantially centrally of the cylinders of the combustion chamber structures and projecting into the main combustion chambers; pre-combustion chamber structures installed in hole portions formed in the projected portions of the combustion chamber structures and forming pre-combustion chambers; fuel supply means installed in the pre-combustion chambers to supply fuel into the pre-combustion chambers; communication ports formed in wall surfaces of the projected portions of the combustion chamber structures, radially extending toward the cylinder periphery and spaced from each other circumferentially of the projected portions to communicate the hole portions with the main combustion chambers; and control valves resting on lower end faces of the pre-combustion chamber structures to cut off or establishes the communication between the pre-combustion chambers and the hole portions; wherein when the control valves are fully open the communication ports are fully open, and when the control valves are partly open the communication ports are partly open.

In this gas engine with a pre-combustion chamber, axis extensions of the communication ports are offset from center axes of the main combustion chambers.

The gas engine with a pre-combustion chamber, which is constructed as described above, works as follows. When the sub-communication ports are open, compressed air flows from the main combustion chamber into the pre-combustion chamber igniting the gas fuel in the pre-combustion chamber. Then, the pressure in the pre-combustion chamber increases causing the unburned air-fuel mixture and flames to be ejected out through the sub-communication ports into the main combustion chamber. At this time, because the sub-communication ports extend radially toward the cylinder periphery, the ejected gas penetrates deep into the cylinder reaching the cylinder periphery quickly. As a result, the mixing of ejected gas with air in the main combustion chamber is quickly achieved, increasing the combustion speed and therefore the performance. Next, as the control valve is further opened, the main communication port is opened allowing the residual gas in the pre-combustion chamber to be ejected out into the main combustion chamber. Particularly during the exhaust stroke, this process ensures that the residual gas in the pre-combustion chamber is discharged into the main combustion chamber, preventing the residual gas from remaining in the pre-combustion chamber.

In the gas engine with a pre-combustion chamber, the passage area of the sub-communication ports is set slightly smaller than actually required so that the total passage area of the sub-communication ports is about 0.5–3.0% of the piston top surface area. This is effective in making the mixture in the main combustion chamber uniform and increasing the combustion speed. Further, the sub-communication ports are formed as grooves which are cut open on the main combustion chamber side, in order to eliminate high stress regions on the main combustion chamber side of the sub-communication ports and reduce the diameter reduction loss. Further, because the outer circumferential surface of the bevel portion of the poppet valve restricts the open area of the sub-communication ports on their underside or on the pre-combustion chamber side, the ejected gas can penetrate deep enough to reach the cylinder periphery improving the air utilization and increasing the combustion speed.

In the gas engine with a pre-combustion chamber of the above construction, which is operated by repeating the suction, compression, expansion and exhaust strokes, the combustion process is performed as follows. Near the top dead center, the control valve is activated to open the sub-communication ports to introduce the compressed air from the main combustion chamber through the sub-communication ports into the pre-combustion chamber where the hot air mixes with and ignites the gas fuel, which was loaded in the pre-combustion chamber. As the pressure in the pre-combustion chamber increases, the gas in the pre-combustion chamber including flames and unburned air-fuel mixture is then ejected out through the sub-communication ports into the main combustion chamber, further promoting the mixing of fuel and air in the main combustion chamber by the strength of the ejection energy, achieving a fast combustion in the main combustion chamber.

Because the sub-communication ports for ejecting the gas such as flames are formed in a radial direction, an increased penetration of the gas is realized. That is, the gas ejected from the pre-combustion chamber can quickly reach the cylinder periphery, mixing with the air in the main combustion chamber and improving the air utilization, which in turn improves the mixture condition, increases the combustion speed and enhances the performance. It is preferred that, considering the throttle loss, the total passage area of the sub-communication ports be set at 0.5–3% of the area of the piston top surface. As the control valve is further opened, the main communication port is opened, facilitating the discharge of the residual gas in the pre-combustion chamber out into the main combustion chamber. This is particularly important during the exhaust stroke. That is, this process ensures that the gas in the pre-combustion chamber is discharged into the main combustion chamber eliminating the residual gas in the pre-combustion chamber and improving the engine performance. Further, if the main combustion chamber side of the sub-communication ports is cut open in the form of grooves, high stress areas of the sub-communication ports on the outlet side can be eliminated. This not only eliminates the problem with strength of the combustion chamber structure but also reduces the throttle loss of the sub-communication ports. In this case, the outer circumferential surface of the bevel portion of the control valve limits the open areas of the sub-communication ports so that the restricted open areas can work as holes to secure sufficient penetration of the ejected gas into the main combustion chamber.

DETAILED DESCRIPTION OF THE EMBODIMENT

Figure 1:
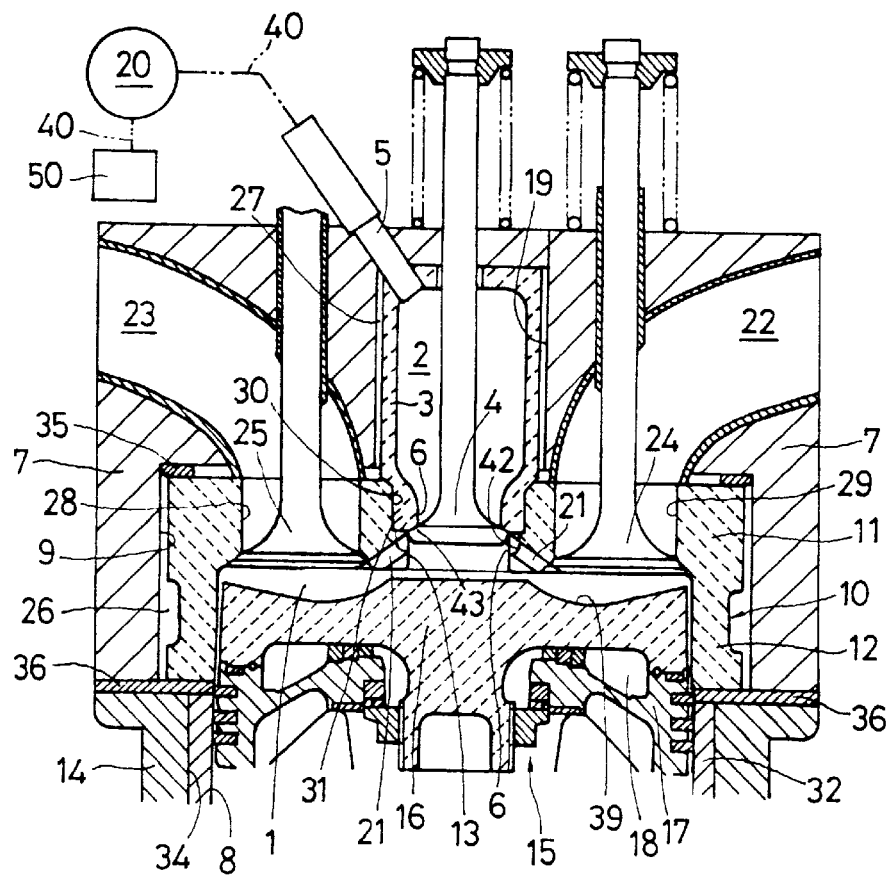
FIG. 1 is a schematic cross section showing a first embodiment of the gas engine with a pre-combustion chamber of this invention.
Figure 2:
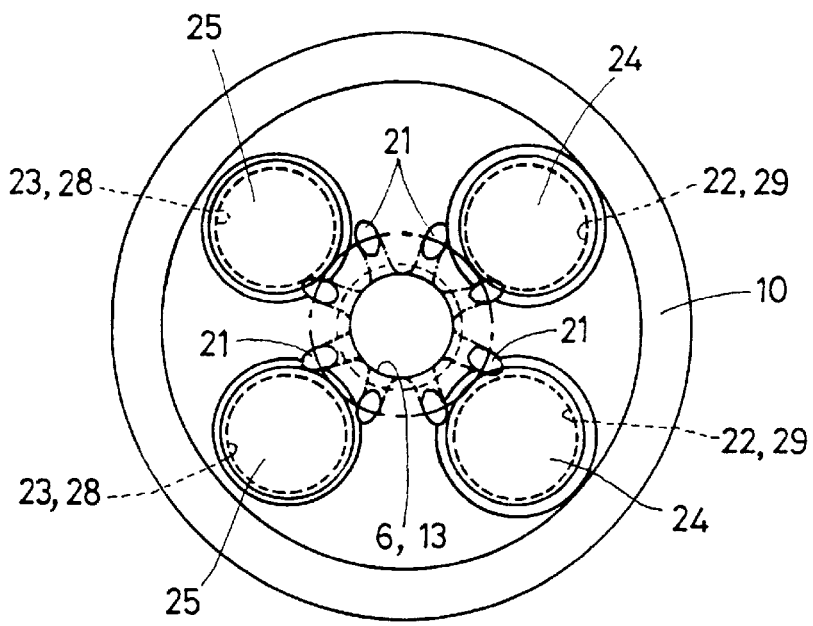
FIG. 2 is a plan view showing the bottom of a combustion chamber structure in the gas engine with a pre-combustion chamber of FIG. 1.

With reference to FIGS. 1 and 2, the first embodiment of the gas engine with a pre-combustion chamber of this invention will be described.

This gas engine with a pre-combustion chamber is operated in a diesel cycle that uses a gas fuel such as natural gas. In this gas engine with a pre-combustion chamber, a cylinder head 7 is secured to a cylinder block 14 through a gasket 36. In a small-diameter cavity 19 formed in the cylinder head 7 is installed a pre-combustion chamber structure 3 that forms a heat-insulated pre-combustion chamber 2. In a large-diameter cavity 9 formed in the cylinder head 7 is installed a head liner 10 that forms a heat-insulated main combustion chamber 1 on the cylinder 8 side. The gas engine with a pre-combustion chamber includes a cylinder liner 32 fitted in a bore 34 formed in the cylinder block 14; a piston 15 that reciprocates in the cylinder 8 formed by the cylinder liner 32; a main combustion chamber 1 formed by the cylinder 8 and a recess 39 in the piston top surface; and a communication port 6 formed both in the pre-combustion chamber structure 3 and the head liner 10 to communicate the pre-combustion chamber 2 with the main combustion chamber 1. A lower end portion 31 of the pre-combustion chamber structure 3 is arranged in a stepped hole portion 30 formed in the upper surface of the head liner 10. At the center of the hole portion 30 is formed the communication port 6.

This gas engine with a pre-combustion chamber has an intake port 23 and an exhaust port 22 both formed in the cylinder head 7. The head liner 10 consists of a liner upper portion 12 forming a part of the cylinder 8 and a head underside portion 11. The head underside portion 11 is formed with a port 28 and a port 29 corresponding to the intake port 23 and the exhaust port 22, respectively, of the cylinder head 7. The port 28 and the port 29 have an intake valve 25 and an exhaust valve 24, respectively. Between the bottom surface of the large-diameter cavity 9 of the cylinder head 7 and the underside portion 11 of the head liner 10 is disposed a gasket 35 and also formed a heat insulating air layer 26, thus making the main combustion chamber 1 heat insulative. Further, between the side wall surface of the small-diameter cavity 19 of the cylinder head 7 and the outer circumferential surface of the pre-combustion chamber structure 3 is formed a heat insulating air layer 27 to make the pre-combustion chamber 2 heat insulative. The piston 15 includes a piston head 16 and a piston skirt 17 fixed to the piston head 16, both made of ceramics such as silicon nitride having excellent heat resistance. Between the piston head 16 and the piston skirt 17 is formed a heat insulating air layer 18 to make the main combustion chamber 1, including the recess 39 in the piston top surface, heat insulative.

The pre-combustion chamber structure 3 is fitted in the small-diameter cavity 19 in the cylinder head 7, with the communication port 6 formed at the lower end portion of the pre-combustion chamber structure 3 communicating with the communication port 6 formed in the head liner 10 to connect the main combustion chamber 1 and the pre-combustion chamber 2. That is, the combustion chamber structure comprising the pre-combustion chamber structure 3 and the head liner 10 is formed with the communication port 6 that communicates the pre-combustion chamber 2 to the main combustion chamber 1. The pre-combustion chamber 2 formed in the pre-combustion chamber structure 3 is located nearly at the center of the cylinder axis. The communication port 6 formed in the head liner 10 has a control valve 4 to open and close the communication port 6. The communication port 6 forms a main communication port 13 that communicates the pre-combustion chamber 2 to the main combustion chamber 1.

In the gas engine with a pre-combustion chamber there is a fuel valve 5 as a fuel supply means for supplying a gas fuel into the pre-combustion chamber 2. The fuel valve 5 opens and closes a fuel supply nozzle formed in the pre-combustion chamber structure 3 installed in the cylinder head 7 and is operated by, for example, a solenoid valve controlled by microcomputer or a cam to open the fuel supply nozzle and inject a gas fuel into the pre-combustion chamber 2. The gas fuel is stored in a fuel source 50 such as a tank installed at an appropriate location. The gas fuel in the fuel source 50 is pressurized by a fuel delivery pump 20 to a pressure of, for example, 5–7 $kg/cm^2$ and the pressurized gas fuel is fed through a fuel supply passage 40 to a fuel supply means 5.

In this gas engine with a pre-combustion chamber, the head liner 10 of the combustion chamber structure and the piston head 16 both forming the main combustion chamber 1, the pre-combustion chamber structure 3 forming the pre-combustion chamber 2, and the cylinder liner 32 are made from ceramics with excellent heat resistance, such as silicon nitride, silicon carbide and sialon. Because the head liner 10, the piston head 16 and the pre-combustion chamber structure 3 are heated to high temperatures, the control valve 4 installed in the communication port 6 and the pre-combustion chamber 2 is made from heat resisting metals and ceramics such as silicon nitride and silicon carbide having high-temperature strength and excellent heat resistance.

Figure 7:
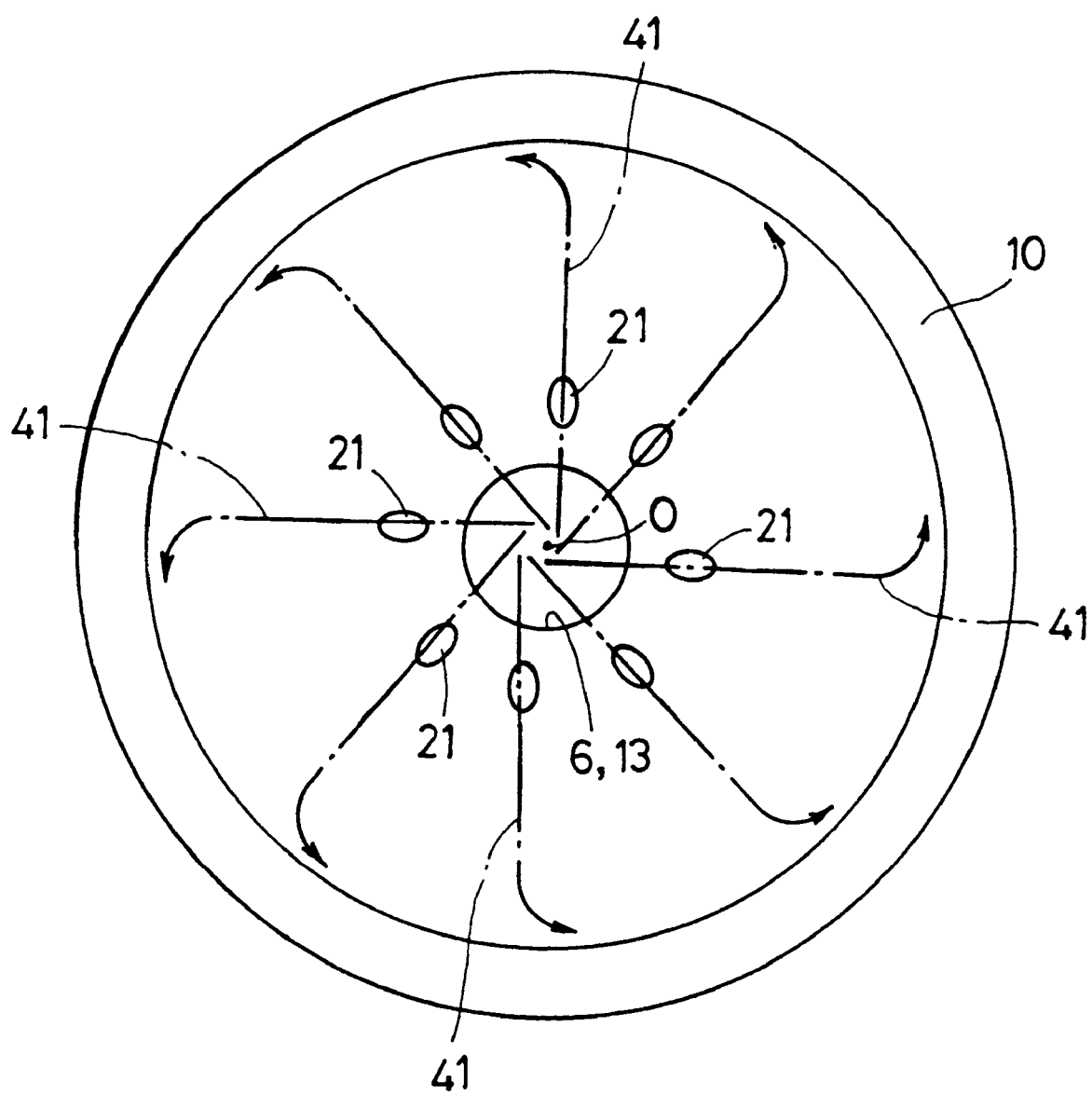
FIG. 7 is a schematic diagram showing a sub-communication port in the gas engine with a pre-combustion chamber of this invention.

This gas engine with a pre-combustion chamber has, in particular, the fuel valve 5 installed in the pre-combustion chamber 2 to supply fuel into the pre-combustion chamber 2. The communication port 6 comprises a main communication port 13 that is open when the control valve 4 is fully open and sub-communication ports 21 that are open when the control valve 4 is partly open. The sub-communication ports 21 are spaced from each other in a circumferential direction around the main communication port 13 formed in the head liner 10 and extend radially from the wall surface of the main communication port 13 toward the cylinder periphery. The number of the sub-communication ports 21 is preferably 4 to 10 (in FIG. 2, eight) to meet a requirement of generating a uniform mixture in the main combustion chamber 1. The sub-communication ports 21 are inclined downward from the pre-combustion chamber 2 toward the main combustion chamber 1. The inclination angle of the sub-communication ports 21 is preferably set at 10–45 degrees with respect to the bottom surface of the head underside portion 11 of the head liner 10 or horizontal plane because this degree of inclination elongates the distance that the unburned mixture and flame ejected from the pre-combustion chamber 2 into the main combustion chamber 1 must travel to reach the cylinder periphery. The total passage area of the sub-communication ports 21 is set at around 0.5–3% of the total area of the piston top surface considering the communication port throttle loss. As shown in FIG. 7, the sub-communication ports 21 are formed such that their axis extensions 41 are offset from the center axis 0 of the main combustion chamber 1.

The control valve 4 is formed by a poppet valve, which, at partical lift, is opened to a position where the end face of the bevel portion of the control valve 4 does not interfere with the sub-communication ports 21. The control valve 4 is so set that it reciprocates with the bevel portion of the poppet valve kept in contact with the wall surface of the main communication port 13.

The gas engine with a pre-combustion chamber having the above construction operates as follows. As the engine repeats four strokes-exhaust, intake, compression and expansion-the gas fuel is supplied from the fuel delivery pump 20 through the fuel valve 5 into the pre-combustion chamber 2. When the control valve 4 opens the sub-communication ports 21, the compressed air flows from the main combustion chamber 1 into the pre-combustion chamber 2 igniting the gas fuel in the pre-combustion chamber 2. The pressure in the pre-combustion chamber 2 increases ejecting unburned air-fuel mixture and flame from the pre-combustion chamber 2 through the sub-communication ports 21 into the main combustion chamber 1. It is noted that because the sub-communication ports 21 extend radially toward the cylinder periphery, penetration of the ejected gas is large, i.e., the ejected gas reaches the cylinder periphery in a short time, quickly mixing with air in the main combustion chamber 1. This increases the combustion speed and therefore the performance. Next, when the control valve 4 is opened further, the main communication port 13 is open allowing the residual gas in the pre-combustion chamber 2 to be ejected from the pre-combustion chamber 2 into the main combustion chamber 1. This ensures that the residual gas in the pre-combustion chamber 2 is discharged into the main combustion chamber 1, preventing the residual gas from remaining in the pre-combustion chamber 2 particularly in the exhaust stroke.

To achieve the above operation, the gas engine with a pre-combustion chamber has the following fuel supply timing for the fuel valve 5 and the open-close timing for the control valve 4. The control valve 4 for opening and closing the communication port 6 opens the sub-communication ports 21 near the end of the compression stroke and closes the ports 21 prior to the timing when the fuel valve 5 supplies gas fuel to the pre-combustion chamber 2. The fuel valve 5 supplies gas fuel into the pre-combustion chamber 2 at the beginning of the intake stroke after the control valve 4 is closed, and then shuts itself before the control valve 4 opens near the end of the compression stroke.

Figure 3:
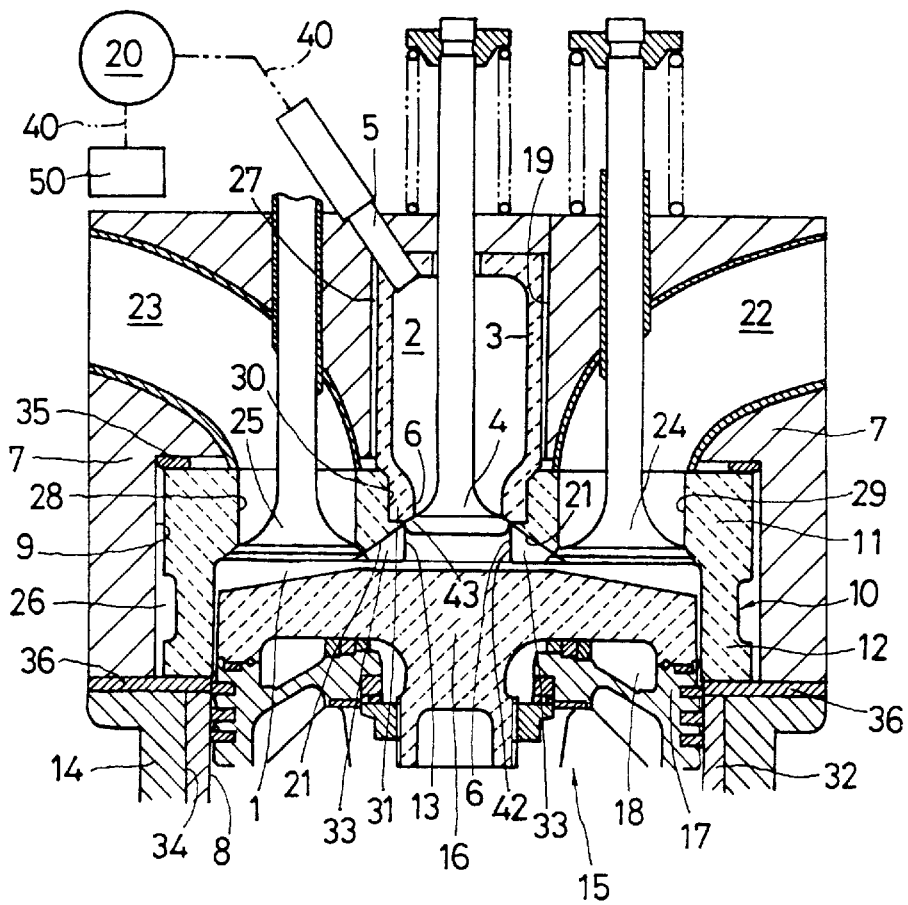
FIG. 3 is a schematic cross section showing a second embodiment of the gas engine with a pre-combustion chamber of this invention.
Figure 4:
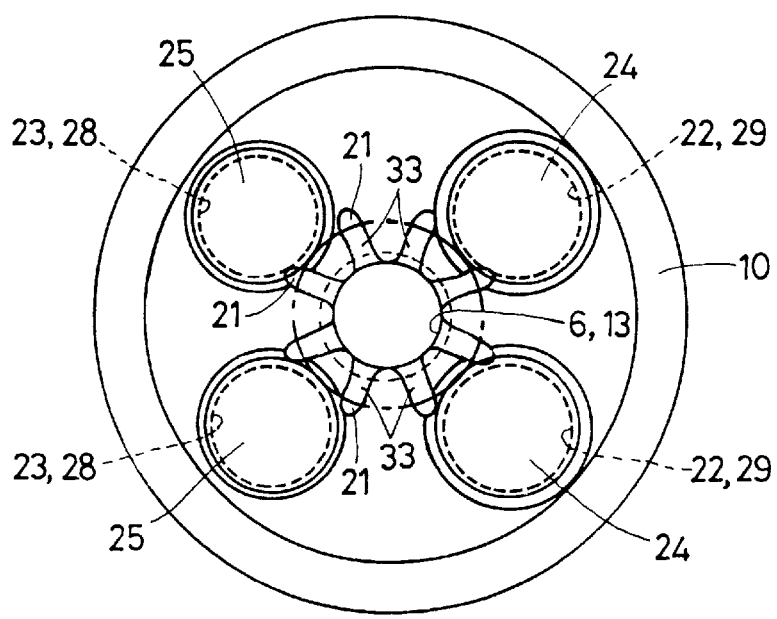
FIG. 4 is a plan view showing the bottom of a combustion chamber structure in the gas engine with a pre-combustion chamber of FIG. 3.

Next, by referring to FIGS. 3 and 4, a second embodiment of the gas engine with a pre-combustion chamber of this invention will be explained. The second embodiment has the similar configuration and workings to the first embodiment except for the structure of the sub-communication port. In these embodiments, parts with identical functions are assigned like reference numerals and their explanations are not repeated.

In the second embodiment of the gas engine with a pre-combustion chamber, a guide portion 42 larger in diameter than the bevel portion 43 of the poppet valve constituting the control valve 4 is formed at the end portion of the main communication port 13 on the pre-combustion chamber 2 side. The sub-communication ports 21 are spaced from each other circumferentially around the main communication port 13 and extend from the guide portion 42 radially toward the cylinder periphery. The sub-communication ports 21 are formed as grooves 33 that are open on the main combustion chamber 1 side, and when the poppet valve is open, the outer circumferential surface of its bevel portion 43 adjusts the open area of the sub-communication ports 21 on the pre-combustion chamber 2 side.

Figure 5:
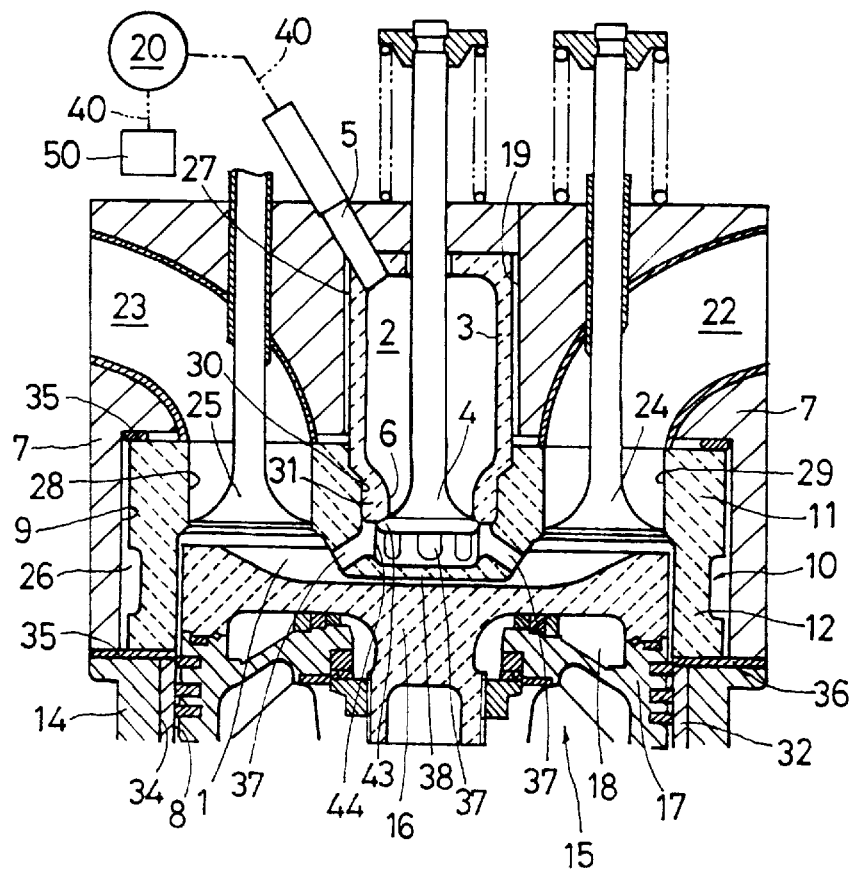
FIG. 5 is a schematic cross section showing a third embodiment of the gas engine with a pre-combustion chamber of this invention.
Figure 6:
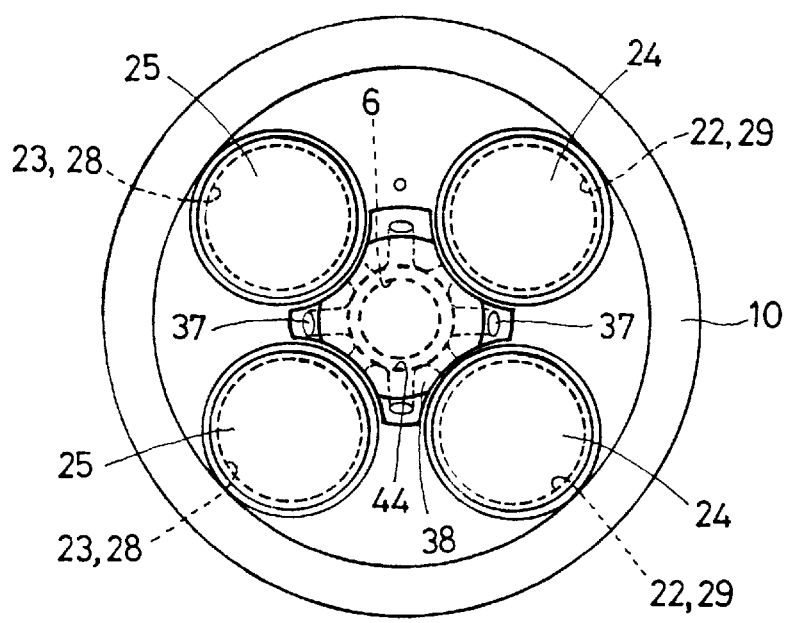
FIG. 6 is a plan view showing the bottom of a combustion chamber structure in the gas engine with a pre-combustion chamber of FIG. 5.

Next, by referring to FIGS. 5 and 6, a third embodiment of the gas engine with a pre-combustion chamber of this invention will be described. The third embodiment is similar to the previous embodiments except for the construction of the communication port and the combustion chamber structure. In these embodiments like reference numbers refer to identical parts and their explanations are not repeated.

In the gas engine with a pre-combustion chamber of the third embodiment, the head liner 10 of the combustion chamber structure is formed with communication ports 37 rather than the main communication port and the sub-communication ports. The head liner 10 slightly protrudes into the main combustion chamber 1 of the cylinder 8 at almost the center of the head underside portion 11, with its front end portion closed to form a projected portion 38.

In this gas engine with a pre-combustion chamber, the head liner 10 has the projected portion 38 at almost the center of the cylinder which projects into the main combustion chamber 1. The projected portion 38 of the head liner 10 is formed with a hole 30, in which a pre-combustion chamber structure 3 forming the pre-combustion chamber 2 is installed. At the central part of the hole 30 is formed a small-diameter hole portion 44. The wall of the projected portion 38 of the head liner 10 is formed with communication ports 37 that extend radially toward the cylinder periphery to communicate the hole portion 44 to the main combustion chamber 1. On the lower end face of the pre-combustion chamber structure 3 is seated a control valve 4 that cuts off or establishes the communication between the pre-combustion chamber 2 and the hole portion 44. The communication ports 37 are fully open when the control valve 4 is fully open and are partly open when the control valve 4 is partly open.

What is claimed is:

1. A gas engine with pre-combustion chambers comprising:
    a cylinder head mounted on a cylinder block;
    valves for opening and closing ports formed in the cylinder head;
    combustion chamber structures installed in cavities in the cylinder head and having cylinders forming main combustion chambers;
    pre-combustion chamber structures arranged at substantially central parts of the combustion chamber structures and forming pre-combustion chambers;
    communication ports communicating the pre-combustion chambers to the main combustion chambers;
    control valves for opening and closing the communication ports; and
    fuel supply means for supplying gas fuel into the pre-combustion chambers;
    wherein the communication ports comprise main communication ports and sub-communication ports;
    wherein when the control valves are fully open the main communication ports and the sub-communication ports are open, and when the control valves are partly open the sub-communication ports are open, and
    wherein the control valves keep the communication ports closed during a length of time from a beginning of an intake stroke to near a top dead center of a compression stroke, the fuel supply means are open when the control valves keep the communication ports closed to thereby admit gas fuel into the pre-combustion chambers, the fuel supply means are then closed at near an end of a compression stroke while the control valves move towards the main combustion chambers to open the sub-communication ports whereby compressed air is permitted to flow from the main combustion chamber into the pre-combustion chamber through passages defined by a peripheral surface of bevel portions of the control valves and wall surfaces of the sub-communication ports, the compressed air being in the form of jet streams that are guided substantially tangentially along the peripheral surface of the bevel portions so as to avoid transverse collision against the bevel portions, and then, following compression-ignition and burning of a mixture of the compressed air and the gas fuel, full movement of the control valves opens the main communication ports so as to permit combustion gas from the pre-combustion chamber into the main combustion chamber at first through the sub-communication ports and sequentially through the main communication ports.

2. A gas engine with pre-combustion chambers according to claim 1, wherein the main communication ports and the sub-communication ports are formed in the combustion chamber structures, and the combustion chamber structures installed in the cavities in the cylinder head comprise head underside portions and liner upper portions forming the cylinders and integral with the head underside portions.

3. A gas engine with pre-combustion chambers according to claim 1, wherein the sub-communication ports are spaced from each other circumferentially around the main communication ports formed in the combustion chamber structure and extend radially from wall surfaces of the main communication ports toward the cylinder periphery.

4. A gas engine with pre-combustion chambers according to claim 1, wherein when the control valves are partly open, end faces of bevel portions of the control valves are opened to a position where they do not interfere with the sub-communication ports.

5. A gas engine with pre-combustion chambers according to claim 1, wherein the control valves reciprocate in contact with the inner wall surfaces of the main communication ports.

6. A gas engine with pre-combustion chambers according to claim 1, wherein the pre-combustion chamber structures forming the pre-combustion chambers, the combustion chamber structures forming the main combustion chambers, and the control valves are formed of any one of heat resistant ceramics and a heat resistant composite material of ceramics and metals.

7. A gas engine with pre-combustion chambers according to claim 1, wherein axis extensions of the sub-communication ports are offset from center axes of the main combustion chambers.

* * * * *